INVENTOR.
FRANCIS C. DU GRENIER
BY
Porter + Meyer
ATTORNEYS

INVENTOR.
FRANCIS C. DU GRENIER
BY
Porter + Meyer
ATTORNEYS

INVENTOR.
FRANCIS C. DU GRENIER
BY
Porter & Meyer
ATTORNEYS

INVENTOR.
FRANCIS C. DU GRENIER
BY
Porter + Meyer
ATTORNEYS

INVENTOR.
FRANCIS C. DU GRENIER
BY
Porter + Meyer
ATTORNEYS

INVENTOR.
FRANCIS C. DU GRENIER
BY
Porter & Meyer
ATTORNEYS

Dec. 14, 1965 F. C. DU GRENIER 3,223,217

MECHANICAL MULTIPLE COIN COUNTING AND CONTROL MECHANISM FOR VENDING MACHINES

Filed Feb. 14, 1964 10 Sheets-Sheet 7

INVENTOR.
FRANCIS C. DU GRENIER
BY
Porter + Meyer
ATTORNEYS

INVENTOR.
FRANCIS C. DU GRENIER
BY
Carter & Meyer
ATTORNEYS

INVENTOR.
FRANCIS C. DU GRENIER
BY
Porter & Meyer
ATTORNEYS

INVENTOR.
FRANCIS C. DU GRENIER
BY
Porter + Meyer
ATTORNEYS 3,223,217

MECHANICAL MULTIPLE COIN COUNTING AND CONTROL MECHANISM FOR VENDING MACHINES

Francis C. Du Grenier, North Conway, N.H., assignor to The Seeburg Corporation, Chicago, Ill., a corporation of Delaware Filed Feb. 14, 1964, Ser. No. 344,919

18 Claims. (Cl. 194—39)

This invention relates to a mechanical multiple coin counting and control mechanism for merchandise vending machines.

More particularly it relates to a mechanical mechanism adapted to count coins as they are inserted into a vending machine of the type adapted to deliver any of a plurality of different articles each from a different section thereof, and to unlock the article delivery means for each such section to permit the delivery of an article therefrom as soon as an amount of money equal to the purchase price of the article in that section has been inserted into the coin receiving portion of such machine.

A particular advantage of the coin counting mechanism of the present invention is that it is not only useful in vending machines designed for its incorporation, but is adapted to be substituted directly for the existing coin control mechanism in a wide variety of existing vending machines both of the mechanically operated type and of the electrically operated type, and when so substituted will permit delivery from such a vending machine of a plurality of different articles having a much wider range in price than has heretofore been possible, especially in connection with mechanically operated machines. A further advantage of the coin counting device of the present invention is that it is adapted to receive and count a plurality of coins of different denominations in any number and in any order.

Mechaical coin controlled mechanisms for vending machines which are capable of accepting coins of different denominations and of delivering merchandise at differing price levels are known. For the most part such mechanisms have had a very limited range. For example, Du Grenier and Perri, U.S. Patent 2,726,749, issued December 13, 1955 discloses a coin controlled mechanism permitting a vending machine to vend articles at two different prices in a price range between 5¢ and 30¢ using any combination of nickels, dimes and quarters, but only if the difference between the two prices is five cents. An improvement of this mechanism disclosed in Du Grenier and Perri U.S. Patent 3,000,485, issued September 19, 1961, permits a vending machine to vend articles at three different prices. The operation of the latter mechanism is, however, limited to the condition that the lowest of these three prices must be equal to the value of a single given coin, and that the other two price levels differ from this lowest price level and from each other by the value of a different coin. Thus in a typical example the three price levels are 25¢, 30¢ and 35¢, and the mechanism requires the insertion of a quarter plus if necessary, one or two nickles or one dime.

It is the purpose of the present invention to provide a mechanical coin counting and control mechanism which eliminates the limitations inherent in these typical prior art devices, and permits the vending of articles from a vending machine at a plurality of differing prices over a wide range with no limitation as to the differential between price levels, or as to the number and order of the particular coins inserted.

For the purpose of illustration, and in order to avoid the unnecessary description of elements that in themselves are old in the art, the specific embodiment of the mechanical coin counting mechanism of the present invention described herein is especially adapted for use with a column in line type of vending machine and is especially adapted to replace in direct substitution the mechanical coin controlling mechanism disclosed in U.S. Patent 3,000,485. Further for illustration mechanical coin counter of the invention as described herein is adapted to accept nickels, dimes and quarters in any combination and to unlock any of the delivery elements of the vending machine in any one, two or three differing price levels (which price levels may be offered at will in the field) between 5¢ and $1.50. It will be apparent from the description that the mechanism can readily be modified by simple redesign of the coin passages to receive coins of any denomination; by simple redesign of the coin counting mechanism to accommodate other price ranges; and upon mere addition or subtraction of substantially identical mechanical unlocking elements to unlock the several delivery elements of the vending machine at as many differing price levels within the given range as may be desired.

The details of the mechanism may best be understood by reference to the drawings, in which.

Figure 1:
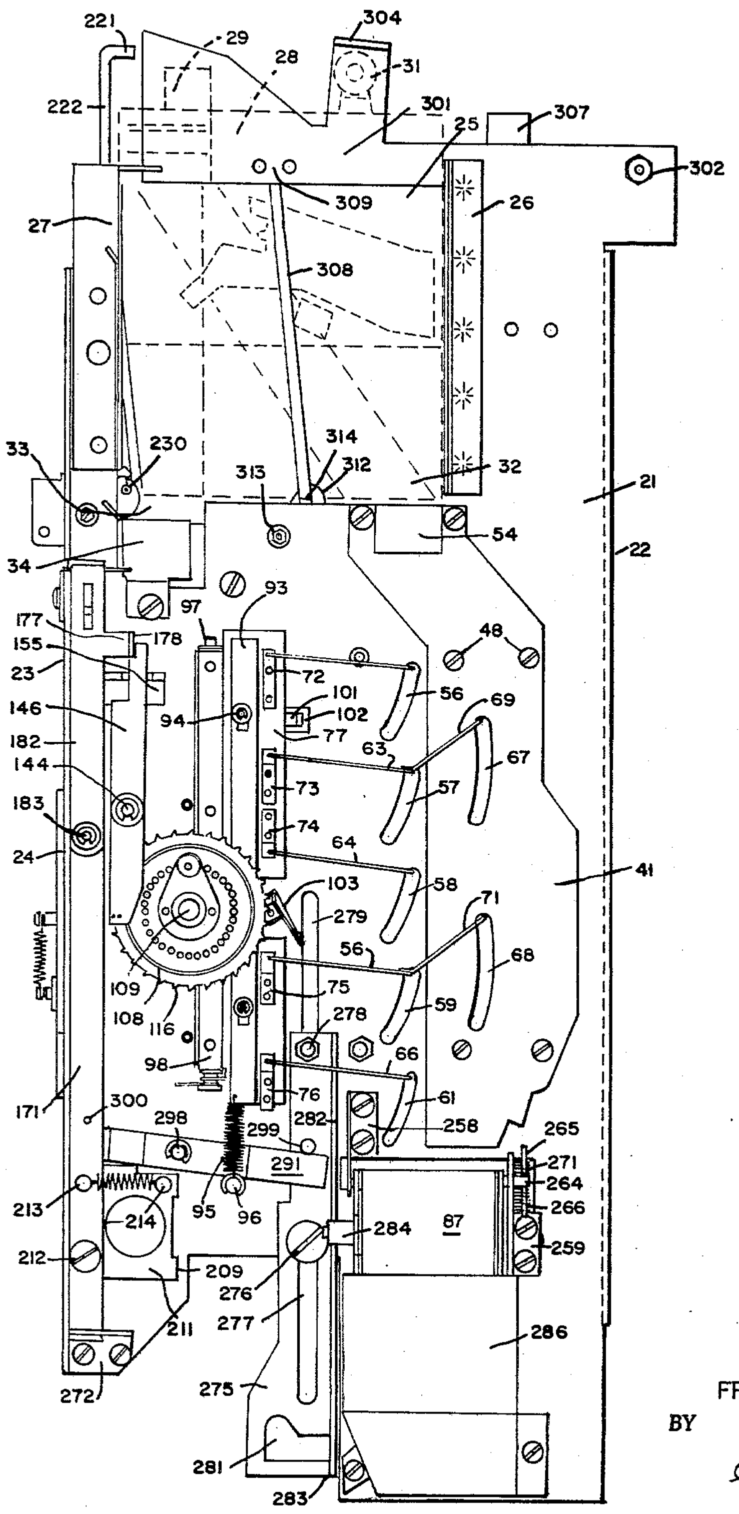
FIG. 1 is a plan view of the right hand side of the mechanism.
Figure 2:
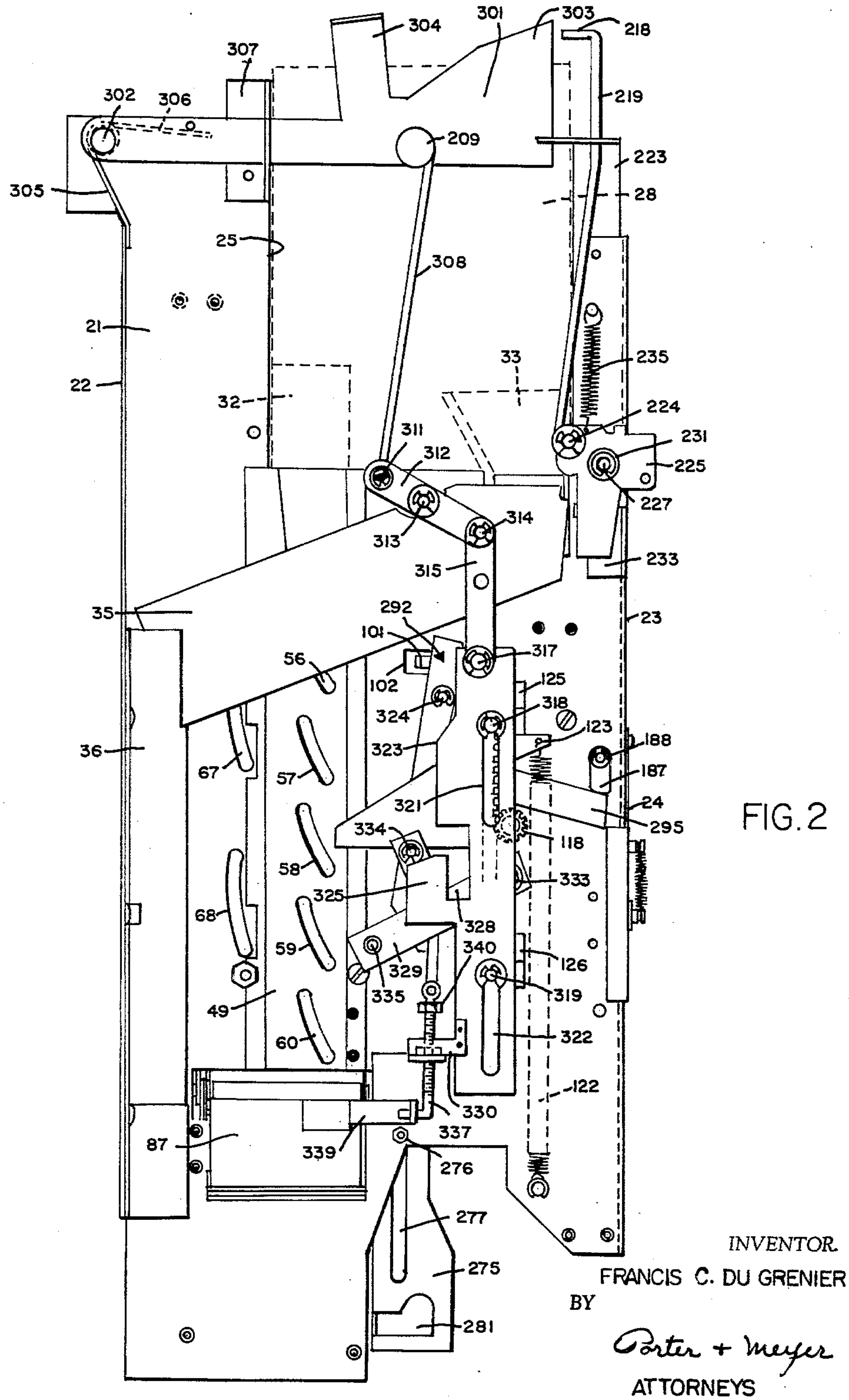
FIG. 2 is a plan view of the left hand side of the mechanism.

Referring to the drawing and especially to FIGS. 1 and 2 thereof the coin counting and control mechanism of the present invention is mounted on a panel 21 provided with a rear flange 22 and a front flange 23. Panel 21 is adapted to be mounted in an upright position on the frame of a vending machine. Mounting means as indicated generally by latch members 24 may be provided on either or both of said flanges to facilitate the mounting and the removal of the mechanism. An aperture 25 of suitable size and shape is provided together with appropriate associated mounting brackets 26 and 27 mounted on panel 21 to receive a conventional coin detector or slug rejector indicated generally at 28. Since the slug rejector itself is a commercially available conventional mechanism and bears no part in the present invention it is shown only in phantom on the drawings. The type of rejector used is the type that receives coins of several denominations such as nickels, dimes and quarters; separates the coins into separate paths through the rejector; and delivers the accepted coins from separate adjacent exit slots. In rejector 28 the coin entrance is indicated generally at 29, the jammed coin clearing mechanism at 31, the accepted coin exit slots at 32 and the rejected coin exit at 33. Rejector 28 is so mounted on panel 21 that the coin exit slot 32 for quarters is located on the left hand side (the side corresponding to FIG. 2) of panel 21 and the nickel and dime exit slots 32 are located on the right hand side of the panel 21. Means including funnel element 34, transverse passage 35 and vertical passage 36 are provided mounted on panel 21 to receive rejected coins from the rejected coin exit 33 of rejector 28 and to deliver such coins back through a coin return passage (not shown) or the article delivery tray (not shown) of the vending machine. Since the mechanism as shown is designed to be placed on the right hand side of a vending machine with its left hand side adjacent to the vending machine itself the rejected coins are delivered from the left hand side of panel 21.

COIN COUNTING MECHANISM

As mentioned above, the coins are separated according to denominations in rejector 28 and are released from rejector 28 through separate exit slots 32. In a typical rejector 28 as illustrated where all of the coin exit slots are identified as 32 the nickel exit slot is on the right (or nearest to the viewer as shown in FIG. 1) the dime exit slot is in the middle and the quarter exit slot is to the left (or furthest away as shown in FIG. 1). As mentioned above, rejector 28 is so mounted relative to panel 21 that the nickels and dimes are released on the right hand side of panel 21, and the quarters on the left hand side of panel 21. Separate generally vertically extending passages or chutes 37, 38 and 39 (respectively for nickels, dimes and quarters) are provided mounted on panel 21 and located to receive the respective coins as such coins fall out of accepted coin exit slot 32 of rejector 28. Nickel chute 37 and dime chute 38 are located on the right hand side of panel 21 and quarter chute 39 is located on the left hand side of panel 21. Structural details of these chutes can best be seen in FIGS. 3, 4, 5 and 6.

Nickel chute 37 and dime chute 38 are located in a single housing indicated generally at 41. Housing 41 comprises nickel chute cover plate 42, nickel chute defining walls 43 and 44, dime chute cover plate 45 and dime chute defining walls 46 and 47. Fastening means indicated generally by screws 48 are provided to fasten the parts together and to mount them on panel 21. Quarter chute 39 indicated generally by housing 49 which comprises quarter chute cover plate 51 and quarter chute defining walls 52 and 53 is affixed by appropriate means to the left hand side of panel 21. Each chute 37, 38 and 39 is so dimensioned both in width and thickness as to permit free passage therethrough of coins of the particular denomination one by one, but with a minimum of clearance so that the coin must follow a predetermined path rather closely. An entrance section of enlarged dimension may be provided for each of the chutes as indicated by outwardly extending bars 54 in nickel chute cover plate 42, or by the widened portion 55 of quarter chute 39 in order to insure that the coins will fall freely from the appropriate slot of the coin exit section 32 of rejector 28 into the appropriate chute 37, 38 or 39 without jamming. For the same purpose the entrance section of chutes 37, 38 and 39 are placed as close to coin exit section 32 of rejector 28 as possible.

A mechanical coin counting means is associated with each of the respective coin chutes in such manner (using still as the example a mechanism which receives nickels, dimes and quarters and where five cents is the basic counting unit) that the counting means is actuated once by the passage of a nickel, twice by the passage of a dime and five times by the passage of a quarter. To accomplish this end the quarter chute housing 49 (and panel 21) is provided with five equally spaced and generally vertically extending slots 56, 57, 58 59 and 61 through which extend one end of corresponding coin contacting wires 62, 63, 64, 65 and 66 respectively. Nickel and dime chute housing 41 (and panel 21) is provided with two slots 67 and 68 through which extend one end of corresponding wires 69 and 71 respectively. Coin contacting wires 62, 63, 64, 65, and 66 are each pivotally mounted adjacent the other end thereof in a bracket 72, 73, 74, 75 and 76 respectively. Brackets 72, 73, 74, 75 and 76 are outstandingly mounted in a vertical array with the pivots therein equally spaced on a vertically extending plate member 77 known as the wire pivot gate riveted assembly. Means including an escapement mechanism described below are provided not only to cause wires 62, 63, 64, 65 and 66 to pivot in unison but also to normally urge the coin contacting end of each of the wires toward the upper end of the respective slots. Nickel and dime chute housing 41 is offset laterally from the position of quarter chute slots 56, 57, 58, 59 and 61 to provide clearance for wires 62, 63, 64, 65 and 66. Coin contacting wire 69 and 71 which extend into slots 67 and 68 are mounted as extension of wires 63 and 65. It will be noted, therefore, that any motion of any other wires will be duplicated by all of the other wires.

Figure 6:
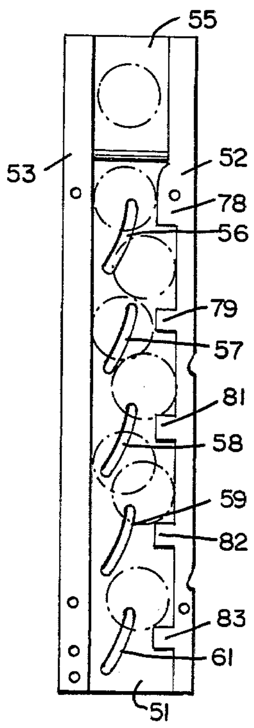
FIG. 6 is a plan view showing details of the quarter chute.

In the normal raised position quarter contacting wires 62, 63, 64, 65 and 66 are oriented substantially horizontally with the pivot end of each slightly higher than the coin contacting end. Each of slots 56, 57, 58, 59 and 61 is formed on a curve corresponding to the motion of each of said wires about its pivot, each slot having a sufficient width and depth that the corresponding wire did not contact any portion of the wall of such slot at any point. Referring to FIG. 6 it will be noted that the inner wall of quarter slot defining wall 53 is oriented vertically and that the inner wall of quarter slot defining wall 52 which is oriented generally vertically is provided with a plurality of outwardly extending projections 78, 79, 81, 82 and 83 each postioned adjacent the upper end of one of the slots 57, 58, 59 and 61 in such manner that the clearance between the tip of each of the projections and wall 53 is only slightly greater than the width of the coin. The clearance between the inner wall of quarter slot defining wall 52 in the space between each successive pair of projections 78–79, 79–81, 81–82 and 82–83 and the corresponding slots 56, 57, 58, 59 or 61 is such that a quarter can pass through only when the corresponding wire 62, 63, 64, 65 or 66 is depressed substantially the full stroke in said slot (the geometry being such that each slot curves away from wall 52 as it extends downwardly).

In its downward path in quarter chute 39 each coin is forced toward the inner wall of wall 53 by the upper sloping edge on top projection 78 at which point it contacts wire 62 in slot 56 forcing wire 62 downwardly. As wire 62 moves down it travels toward wall 53 and away from wall 52, thereby unbalancing the coin and forcing it to move away from contact with the inner wall or wall 53 into contact with the inner wall of wall 52 in the recess between projections 78 and 79 as soon as the upper edge clears the lower edge of projection 78. As the wire and coin move down in contact with each other the point of contact between the wire and the coin moves from the bottom of the coin above the edge of the coin located closest to wall 53. By the time the bottom edge of the coin contacts the upper edge of projection 79 the point of contact with wire 62 is above the mid-point of the coins, the escapement mechanism has been released one step, and the wire is free to move upwardly towards its raised position. Since projection 79 extends out from wall 52 for a distance less than half of the width of the coin the coin is unbalanced and tends to roll towards wall 53. This rolling motion of the coin brings the upper quadrant of the coin into contact with the upwardly moving wire 62 which in turn prevents the coin from rolling out of contact with projection 79 until the wire has returned substantially to its elevated normal position.

Since all of the wires move simultaneously this action brings wires 63 into coin detecting position before the coin is free to fall through the space between projection 79 and wall 53. As soon as the coin comes into contact with the wire 63 the same action as described above is repeated. The same is also true in the case of wires 64, 65 and 66. The successive positions of the coin passing down quarter chute 39 are shown in phantom on FIG. 6. The successive trapping of the coin in each of the successive recesses insures that each successive coin detecting wire, and therefore the escapement mechanism, is in position to record the passage of the coin before the coin actually passes through each successive stage. This eliminates the need for matching the speed of the escapement with the rate of fall of the coin. Therefore a relatively weak counter-balancing force may be used for the escapement which permits the same escapement mechanism to be used both for relatively light coins, such as dimes, and relatively heavy coins, such as quarters.

Figures 3, 14:
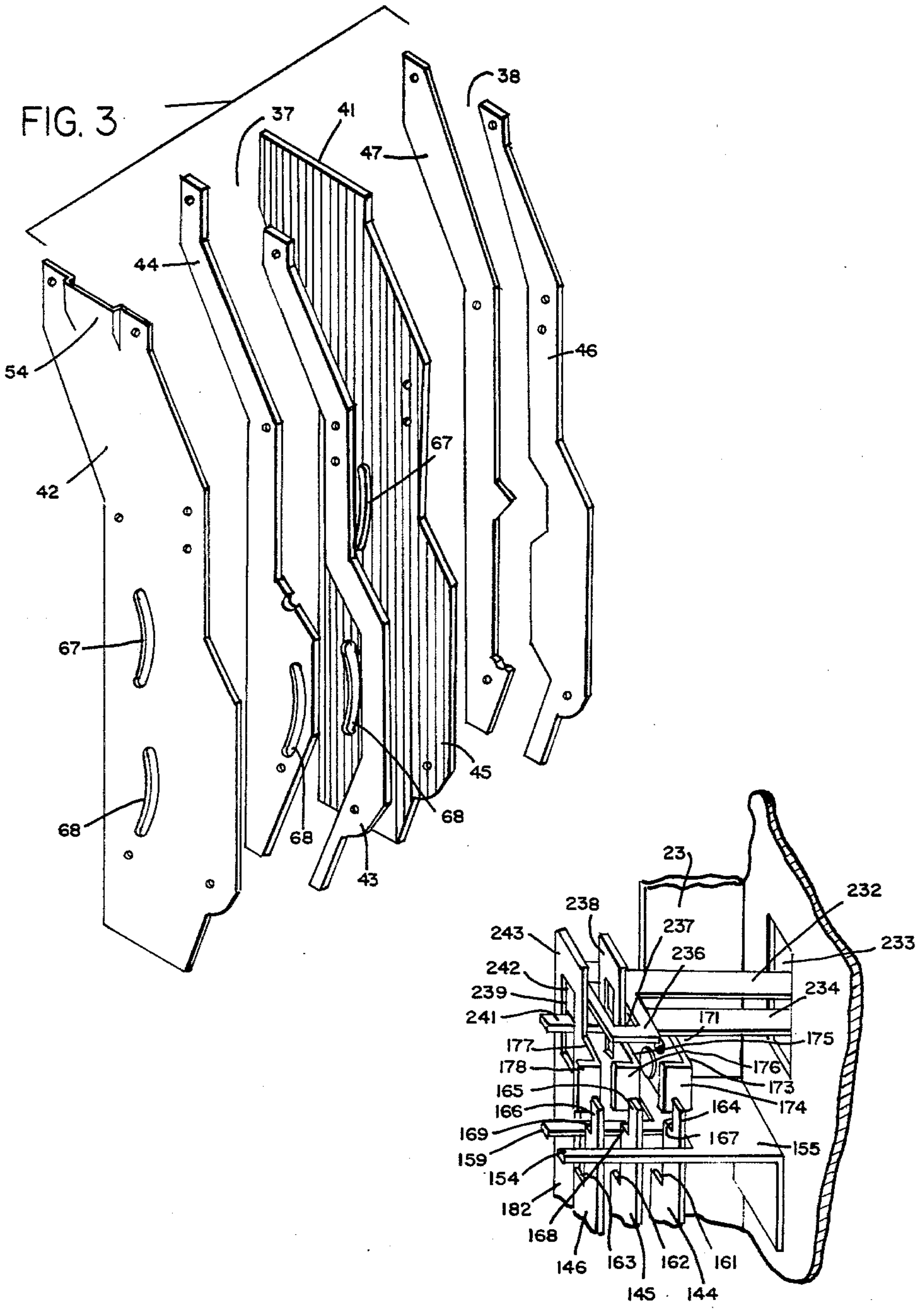
FIG. 3 is a break-away perspective of the coin chutes.
FIG. 14 is a perspective view of a detail of FIG. 11.
Figure 4:
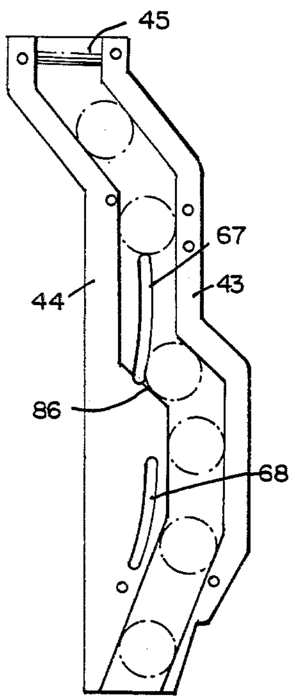
FIG. 4 is a plan view showing details of the nickel chute.
Figure 5:
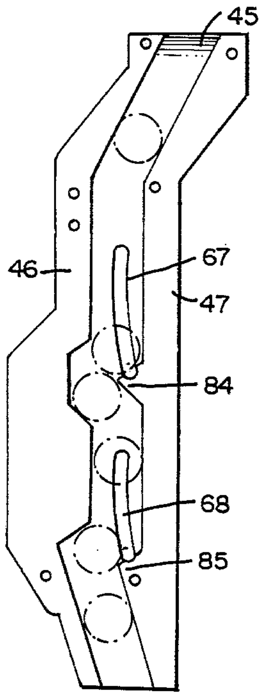
FIG. 5 is a plan view showing details of the dime chute.

Nickel chute 37 and dime chute 38 are somewhat differently arranged as shown in FIGS. 3, 4 and 5. Both have an offset position to bring the coins into a different path than that of the quarter chute so that there will be no interference between the nickel and dime contacting wires and the quarter contacting wires. In the case of dime chute 38 the coin is permitted to drop vertically into successive contact with wire 69 and wire 71, both of which are arranged generally in the middle of the chute in slots 67 and 68 respectively with said slots extending generally parallel to the chute. The precise configuration of each slot of course is a curve since wires 69 and 71 are extensions of wires 63 and 65 which in turn are pivoted at 73 and 75 respectively. A V-shaped projection 84 is provided on the inner surface of dime chute wall 47 in a position that its top surface intercepts the bottom end of slot 67. A corresponding recess is provided in dime chute wall 46 which recess has sufficient size to just permit passage of the coin about projection 84. A second projection 85 is provided in wall 47 in such position that the upper sloping surface of projection 85 intercepts the bottom slot 68. A corresponding recess is again provided in wall 46. Thus as a dime falls down dime chute 38 it first comes into contact with nickel and dime contacting wires 69 pushing wire 69 down and releasing the escapement one position as noted. As soon as, but not until, wire 69 reaches a point near the bottom of its full stroke the coin contacts projection 84 and is free to slip sideways around projection 84 out of contact with wire 69. This permits wire 69 to return to its normal upper position. The coin then contacts wire 71 forcing wire 71 from its upper normal position downwardly again releasing the escapement one position until the coin contacts projection 85 at which point it is free to slide out of contact with the wire and down out of dime chute 38.

The upper portion of nickel chute 37 extends generally parallel to dime chute 38 and similarly dime chute 38 is provided with a sloping projection 86 in such position that the upper surface of projection 86 intercepts slot 67. Thus as a coin falls down nickel chute 37 it contacts wire 69 forcing wire 69 from its upper normal position through a full stroke. As wire 69 approaches the limit of its stroke (releasing the escapement one notch) the coin contacts the upper wall of projection 86 and is free to slide sideways out of contact with wire 69. The nickel chute is so arranged that the coin drops vertically bypassing slot 68 (and wire 71) and is directed out of the chute. Thus the escapement is actuated only once upon the passage of a coin down the nickel chute.

Upon leaving chutes 37, 38 or 39 the coins drop directly into a coin bucket 87 hingedly mounted in an aperture provided for the purpose in frame 21.

ESCAPEMENT MECHANISM

As mentioned above each of the wires 62 through 66 is pivotally mounted on brackets 72 through 76 mounted on plate 77. The details of this mounting are shown in the case of wire 64 and bracket 74 in FIG. 12. It will be noted that wire 64 is bent at right angles to its horizontal portion and this right angled portion is pivotally mounted in bracket 74 by means of hole 88 and in plate 77 by means of a corresponding hole 89. Wire 64 is then bent parallel to plate 77 and passing behind plate 77 to to slot 91 where it is bent outwardly then engages in a hole 92 provided for this purpose in flat rod 93 mounted in brackets indicated at 94 for limited vertical reciprocal travel relative to plate 77. Thus the downward motion of wire 64 due to the passage of coin is reflected in a corresponding upward movement of rod 93. All of the wires 62 through 66 are mounted on their respective brackets 72 through 76 and on bar 93 in this same way, with bar 93 serving as the linkage mechanism to move all of the wires simultaneously. A light spring 95 mounted between bar 93 and a bracket 96 mounted on panel 21 normally urges bar 93 to a downward position and hence urges wires 62 through 66 to a normal upward position. The weight and the leverage of the assembly and the force of the spring are adjusted so that the wires are depressed readily by the weight of the lightest coin passing through the coin counting mechanism.

Mounting plate 77 is hingedly mounted at its forward end (the left hand side as shown in FIG. 1) by means of hinges 97 and 98 to panel 21. A spring 99 associated with hinge element 98 and acting between plate 21 and plate 77 normally keeps plate 77 in close contact with plate 21. A lever 101 mounted on the rear side of plate 77 and passing through aperture 102 and panel 21 is provided when depressed to rotate plate 77 about hinge members 97 and 98 away from panel 21 and move wires 62 through 66 out of their respective slots thus clearing the coin chute in the case of a jam or other malfunction. Lever 101 is so actuated during the mechanism reset cycle as explained below.

A pawl assembly 103 is provided pivotally mounted on shaft 104 which shaft is affixed to bracket 105 mounted on panel 21. Assembly 103 is provided with a forwardly extending arm 106 which in turn is provided with an aperture that engages pin 107 that projects inwardly (toward panel 21) from rod 93 in such manner that the up and down motion of rod 93 moves arm 106 up and down rocking assembly 103 about its pivot on shaft 104. A cutaway portion is provided in plate 77 of sufficient size that arm 106 will clear plate 77 even when plate 77 is located about hinge elements 97 and 98 to the maximum extent and pin 107 is provided sufficiently long to remain in engagement with the aperture on arm 106 under such circumstances.

Pawl element 103 is mounted in close association with ratchet wheel 108 mounted on shaft 109 and is provided with a spring element supporting member 111 which has an upper extension 112 and a lower extension 113 (relative to shaft 104) a spring element 114 attached at its lower end to the lower extremity of lower extension 113 and bent adjacent its upper end over upper extension 112 to form a ratchet engaging tip 115 which is adapted to engage ratchet teeth 116 of wheel 108, and a heel portion 117 below shaft 104 adapted to engage ratchet teeth 116 when ratchet engaging tip 115 is rotated out of contact with ratchet teeth 116 by the motion of pawl assembly 103 caused by the movement of rod 93. Thus as rod 93 moves upward in response to the passage of a coin in contact with one of the coin engaging wires pawl assembly 103 is rocked around shaft 104 moving ratchet engaging tip 115 out of contact with the next successive ratchet tooth 116 and moving heel portion 117 into the path of the ratchet teeth 116. As soon as the coin engaging wire is released rod 93 is returned to its lower position by the action of spring 95 and pawl element 103 is returned to the position where ratchet engaging tip 115 engages the next ratchet tooth 116 and heel portion 117 is out of the path of the teeth 116. The space in between tip 115 and heel portion 117 is such that wheel 108 once tip 115 is released from a tooth 116 can rotate a distance of about ½ a ratchet tooth interval before another ratchet tooth 116 engages heel portion 117. Thus ratchet wheel 108 revolves a distance equal to one ratchet tooth interval for each stroke of rod 93.

Ratchet wheel shaft 109 extends through panel 21 and is supported therein by a journal not shown. On the opposite side (the left hand side) of panel 21 there is mounted on shaft 109 a pinion 118 which engages a rod 119 extending along one side of vertically extending bar 121 mounted for vertical travel on suitable brackets 125 and 126 mounted on the left hand side of panel 21. A spring 122 mounted between a laterally extending bracket 123 mounted on bar 121 and a suitable bracket 124 mounted on panels 21 urges bar 121 downwardly. The force of spring 122 urges ratchet wheel 108 in a clockwise direction (as seen in FIG. 1) thus keeping ratchet teeth 116 of ratchet wheel 108 in engagement with pawl member 103 causing ratchet wheel 108 to revolve during the stepwise to release action of the pawl member 103. The capacity of the coin counter mechanism is determined by the number of ratchet teeth 116 arranged around the periphery of ratchet wheel 108. For example, in a coin counting mechanism designed to count by increments of 5¢ to a maximum of $1.50 ratchet wheel 108 is provided with thirty teeth 116.

PRICE CHANGE MECHANISM

In the coin counting mechanism shown provision is made for three different price levels. It will be understood that the number of potential price levels can be increased or decreased merely by providing more or less price change mechanism elements.

Figures 7, 10, 11:
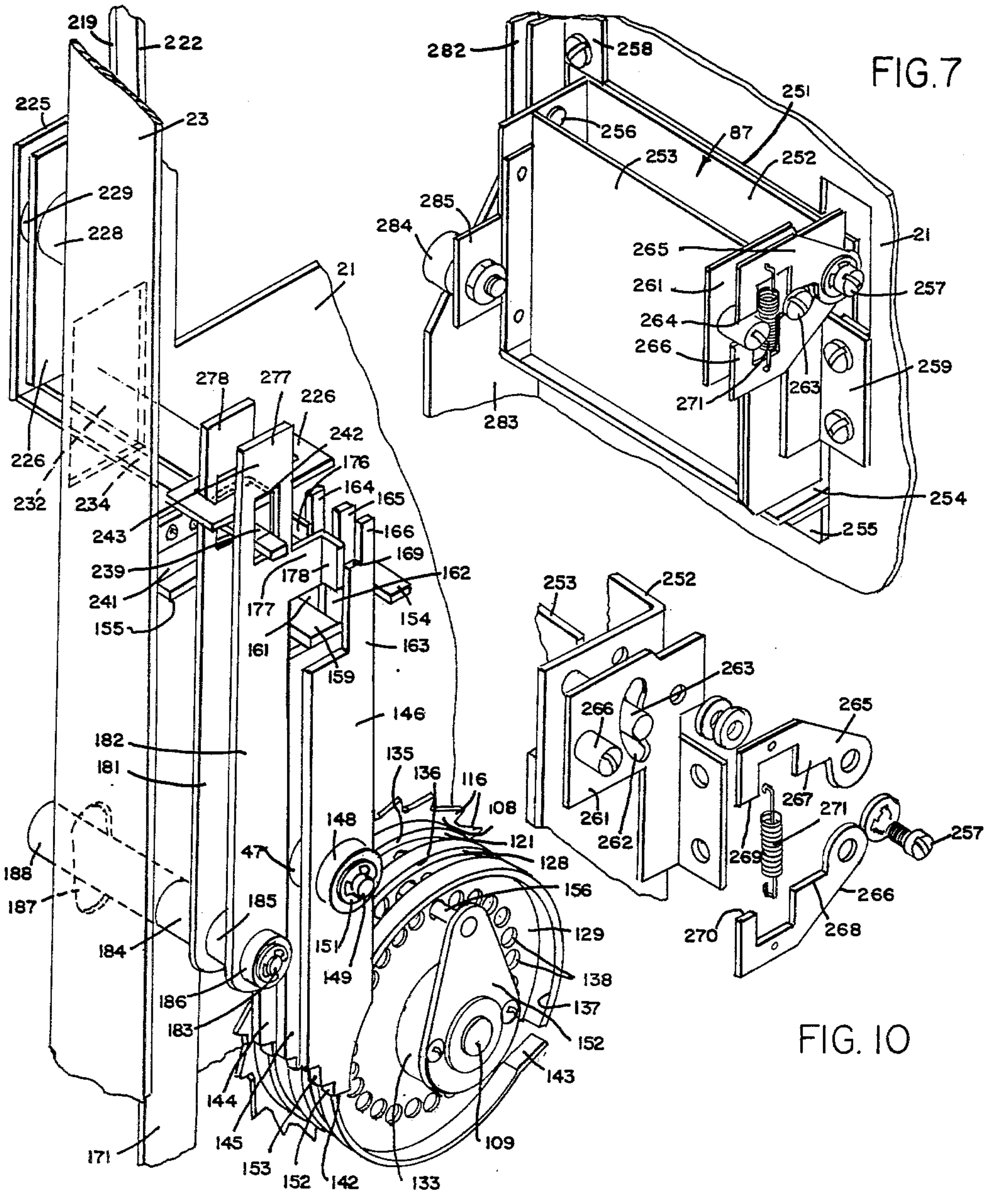
FIG. 7 is a perspective view of the coin bucket.
FIG. 10 is a break away perspective showing details of the coin bucket centering hinge.
FIG. 11 is a perspective view of the coin totalizing and machine unlocking mechanism.
Figures 12, 13:
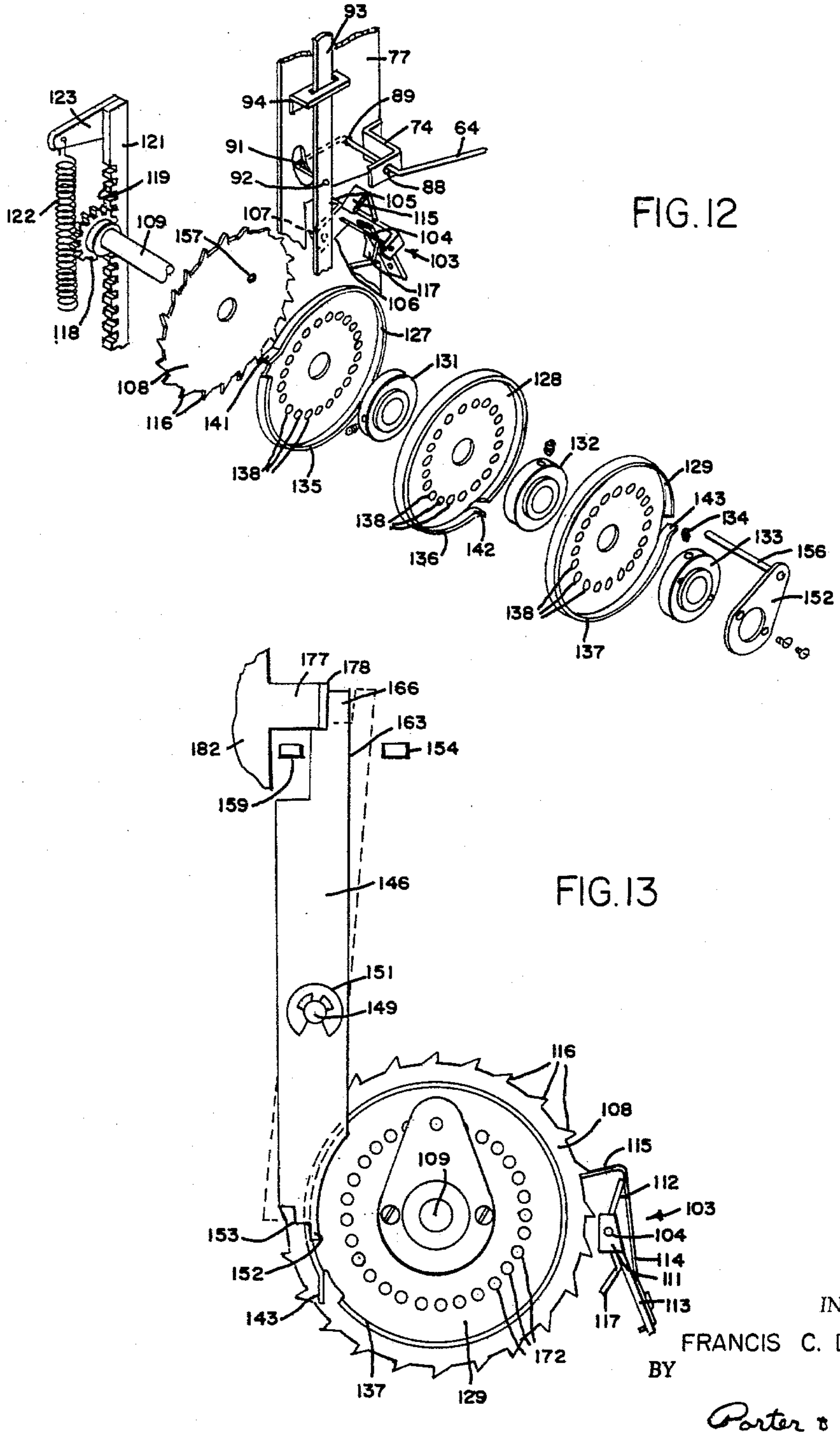
FIG. 12 is a break away perspective showing the coin totalizing mechanism.
FIG. 13 is a plan view of the coin totalizing mechanism and details of the lock actuating cams.

The basic price change mechanism elements is the price change cam wheel. For a three price level operation three identical such cam wheels are provided as indicated in FIGS. 11 and 12 at 127, 128 and 129. Each cam wheel 127, 128 and 129 is adapted to be rotatably mounted on shaft 109. Low price cam wheel 127 is located with its side adjacent to ratchet wheel 108. Spacing bushings 131 and 132 located between the cam wheels 127–128 and 128–129 are provided to separate and space wheels and a locking bushing 133 provided with a set screw 134 is provided on the outer side of high price cam wheel 129. Each cam wheel 127, 128 and 129 is provided with an upstanding edge 135, 136 and 137 respectively. Each such edge acts as a cam surface. Each cam wheel 127, 128 and 129 is provided with a plurality of holes 138 equal in number to the number of ratchet teeth 116 on ratchet wheel 108. Holes 138 are equally spaced and arranged on a radius. Each cam surface 135, 136 and 137 is provided with a severed and bent out portion acting as a cam lever gauge indicated at 141, 142 and 143 respectively.

Three cooperating cam levers 144, 145 and 146 are provided. Levers 144, 145 and 146 are each provided at an intermediate point with a spacing bushing indicated at 147 and 148 for rotatable mounting on outstanding shaft 149 mounted on panel 21. Locking means are provided on shaft 149 at 151. A collar (not shown) is provided surrounding shaft 149 between panel 21 and lever 144 to maintain the alignment of lever 144 with cam surface 135. Each lever 144, 145 and 146 extend substantially vertically just outside of its corresponding cam surface (135, 136 and 137 respectively) to a point substantially horizontal to shaft 109. An inwardly extending cam surface contacting tab 152 is provided at the lower extremity of each of levers 144, 145 and 146. Each of such cam surface contacting tab 152 is adapted to engage the inner surface of cam surface 135, 136 or 137 as the case may be. Tabs 152 are provided by bending a portion of lever 144, 145 or 146 inwardly. A second inwardly extending cam engaging tab 153 is provided by bending the next portion of the levers 144, 145 or 146 above that portion used for tab 152. Each such tab 153 is adapted to engage the outer surface of cam surface 135, 136 or 137. The two tabs 152 and 153 are displaced vertically and are displaced laterally so that the one may normally remain on the outside of the appropriate cam surface, the other may normally remain on the inside of said cam surface and the cam surface may pass freely between the two.

Locking means are provided to cause each of cam wheels 127, 128 and 129 to rotate in unison with ratchet wheel 108. At some point in this rotation tabs 152 and 153 come in contact with the appropriate gauge 141, 142 or 143. As the gate comes into contact with the tab upper outer tab 153 is forced outwardly as the outer surface of the cam surface in the region of the gate comes into contact with tab 153. This displaces the lower portion of the cam lever outwardly as shown in phantom in FIG. 13. The height of the gate i.e. the amount by which the free edge of that portion of the cam surface comprising the gate is offset from the remainder of the cam surface, is adjusted to cause the respective levers to be displaced sufficiently to cause lower cam surface engaging tab 152 to engage the outer surface of the cam surface. Since tab 152 is lower than tab 153 tab 152 engages the outer surface of the cam surface before tab 153 leaves contact with the gate as the cam wheel continues to revolve.

An outstanding arm 154 is provided on bracket 155 mounted on panel 21 in a position to engage the rear edge of an upwardly extending extension of each of levers 144, 145 and 146 when each such lever is displaced by means of tab 152 passing through the respective gauge 141, 142 or 143. Arm 154 keeps the respective tab 152 in close association with the outer surface of cam surface 135, 136 or 137. Thus if the direction of rotation of ratchet wheel 108 is reversed as when the mechanism is reset, tab 152 engages the inner surface of the respective gate and is returned into contact with the inner surface of the respective cam surface. Thus each cam lever 144, 145 and 146 is locked at all times in either of two positions, a normal or closed position where the associated mechanism remains locked, and an open position where the lower end of each said lever is displaced to the left or outwardly (as shown in FIGS. 1, 11 and 13) relative to the respective price cam wheels 127, 128 and 129 and its upper end is forced toward the right and rests against arm 154. Tabs 152 and 153 and gauges 141, 142 and 143 are so dimensioned that the transition from the closed position to the open position and vice versa occurs in a space equal to the space between successive ratchet teeth 116.

As mentioned above, each of the cam wheels 127, 128 and 129 are free to revolve relative to shaft 109 and hence relative to ratchet wheel 108 which of course is fastened to shaft 109. Means are provided to lock cam wheels 127, 128 and 129 into a predetermined position relative to ratchet wheel 108. This means comprises a pin 156 adapted to pass through any hole 138 in each of wheels 127, 128 and 129 and a hole 157 provided in ratchet wheel 108. Pin 156 is mounted on a bracket 158 which in turn is removably mounted on locking bushing 133. Alternatively bracket 158 may be fixedly mounted on bushing 133 and pin 156 removably mounted on bracket 158. The lower rear side of each of levers 144, 145 and 146 is suitably shaped to provide for the passage of pin 156 without interference as to ratchet wheel cam wheel assembly rotates.

Thus in operation each price change cam wheel 127, 128 or 129 is revolved relative to ratchet wheel 108 so that the corresponding gate 141, 142 or 143 will come into contact with tabs 152 and 153 moving the respective levers 144, 145 and 146 into the open position when pawl mechanism 103 has released the number of ratchet teeth 116 corresponding to the selling price of the article in the compartment controlled by the particular price change cam wheel 127, 128 or 129. When each such cam wheel has been revolved relative to ratchet wheel 108 into the desired position pin 156 is inserted through matching hole 138 in each of the wheels and through hole 157 in ratchet wheel 108 locking the cam wheels into a fixed position relative to ratchet wheel 108. Markings may be provided on ratchet wheel 108 and on each of the cam wheels 127, 128 and 129 to facilitate the adjustment of the various wheels to specific prices. Holes 138 and gates 141, 142 and 143 are positioned relative to each other in such manner that in each case lever 144, 145 or 146 will move from a closed position to an open position as the ratchet engaging tip 114 of pawl assembly 103 moves from contact with one ratchet tooth 116 to the next successive ratchet tooth 116.

In the mechanism as described the lowest price is set on inner cam wheel 127, the highest price on outer cam wheel 129, and the intermediate price on intermediate cam wheel 128, if the mechanism is to be set for three prices. However, by setting two of the cam wheels so that the gate in both will become operative at a ratchet wheel position corresponding to a single price, or by setting all three of the cam wheels to a single price in such manner the mechanism may readily be adjusted to vend articles at two price levels, or at a single price level if desired. Obviously, also the machine need not necessarily be provided with three price change cams and the associated release mechanism for each such cam, but rather may be provided with as many such cams and the associated release mechanism for each such cam as the number of desired price levels.

VENDING MACHINE RELEASE MEANS

The upper end of each cam lever 144, 145 and 146 is provided with two integral extensions (see FIGS. 11 and 14). The first such extension (indicated at 161, 162 and 163 respectively) extends the cam lever in each case through the gap between outstanding arms 154 and 159 of bracket 155. At the upper end of each of extensions 161, 162 and 163 a further integral extension 164, 165 and 166 respectively is arranged having a further reduced width. The transition from extension 161 to extension 164 provides a horizontal shoulder 167. Similar horizontal shoulders 168 and 169 are formed by the transition from extension 162 to extension 165 and from extension 163 to extension 166 respectively. As mentioned above, when the cam levers 144, 145 and 146 are in their normal or closed position the lever extends in each case substantially vertically. In this position the forward surface of extensions 161, 162 and 163 are in contact with, or in close association with, bar 159 of bracket 155. Upon rotation of ratchet wheel 108 and the corresponding rotation of cam wheels 127, 128 and 129, the lower tab 152 of each of cam levers 144, 145 and 146 will pass upon a predetermined degree of rotation through corresponding gates 141, 142 and 143 moving at such time the respective cam levers 144, 145 and 146 into the open position. In the open position the rear surface of the upper end of each lever comes into contact with outstanding bar 154 of bracket 155 moving the forward surface of each away from bar 159. It is this action of cam levers 144, 145 and 146 that unlocks the vending mechanism of the associated vending machine permitting delivery of articles therefrom.

To accomplish this a vertical lock bar 171 mounted for vertical reciprocal sliding motion with one edge closely associated with front flange 23 of panel 21 in slots provided for this purpose in bracket 155 and bracket 172, both of which are mounted on panel 21. At the upper end of vertical lock bar 171 there is fastened a rearwardly extending lock arm 173 provided with a shoulder engaging section 174 adapted to rest on shoulder 167 of cam lever 144 when cam lever 144 is in its normal closed or locked position. The motion of the upper end of lever 144 when the lever is moved from its closed position to its open position is sufficient to move shoulder 167 out of contact with shoulder engaging extension 174 of lock arm 173 permitting shoulder engaging extension 174 to pass in front of extension 161 of lever 144 should bar 171 move downwardly relative to lever 144. A similar lock arm 175 having a shoulder engaging extension 176 adapted to rest on engaged shoulder 168 of lever 145 when lever 145 is in its closed position, and a lock arm 177 having a shoulder engaging extension 178 adapted to rest on and engage shoulder 169 of lever 146, when lever 146 is in its closed position are also provided. Lock arm 175 is mounted at the upper end of stub lock bar 181 and lock arm 177 is mounted at the upper end of stub lock bar 182. Stub lock bars 181 and 182 are pivotally mounted at the lower end of each thereof on shaft 183 which shaft in turn is mounted on lock bar 171 at an intermediate point. Suitable spacing bushings 184 and 185 plus a suitable locking bushing 186 are provided on shaft 183 to maintain stub lock bars 181 and 182 in the predetermined position where shoulder engaging extensions 176 and 178 may engage shoulders 168 and 169 of levers 145 and 146 respectively. Means described below, which means include a spring, normally urge the rear edges of stub lock bars 181 and 182 into contact with the forward surface of arm 159 of bracket 155. In this position the shoulder engaging extensions of each such stub lock bar will engage the shoulder on the corresponding cam lever when the corresponding cam lever is in its normal or closed position. An extension of shaft 183 extends beyond bar 171 through aperture 187 provided in panel 21 terminating in stub 188 which extends out on the left hand side of panel 21.

When all three cam levers 144, 145 and 146 have moved from their closed position to their open position (the condition when sufficient coins have been inserted into the coin counting mechanism to move ratchet wheel 108 to the highest price setting) shoulders 167, 168 and 169 moves out of contact with shoulder engaging extensions 174, 176 and 178 of lock arm 173, 175 and 177 thus permitting lock bar 171 to slide downwardly relative to panel 21 under its own weight to its lower unlocked position. On the other hand if any one of shoulder engaging extensions 174, 176 or 178 remain in contact with the corresponding shoulders 167, 168 or 169 lock bar 171 is maintained in its upper or locked position.

Figure 18:
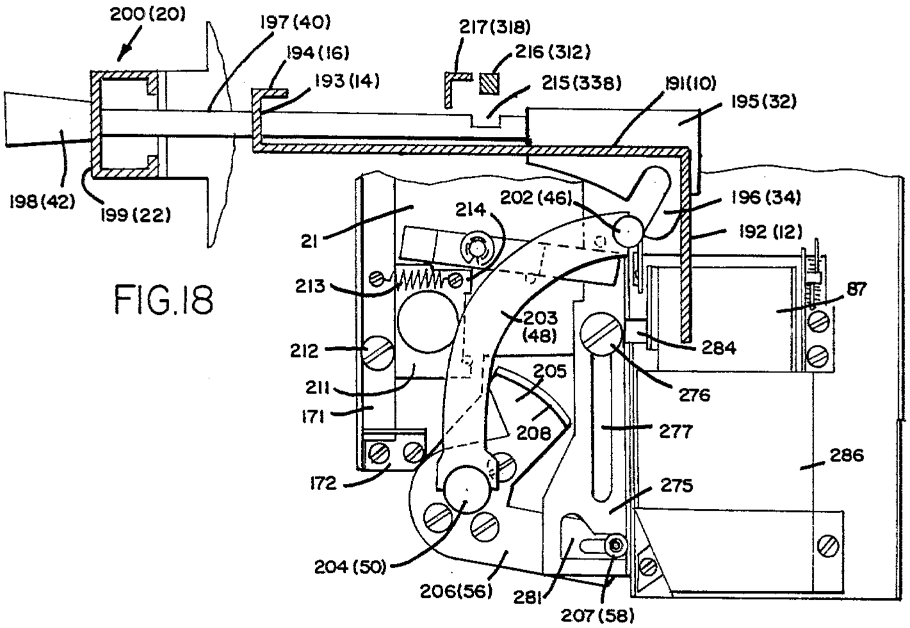
FIG. 18 is a plan view showing the association of the coin counting and control mechanism of the present invention with typical article delivery elements of a typical vending machine with said delivery elements in the normal position.
Figure 19:
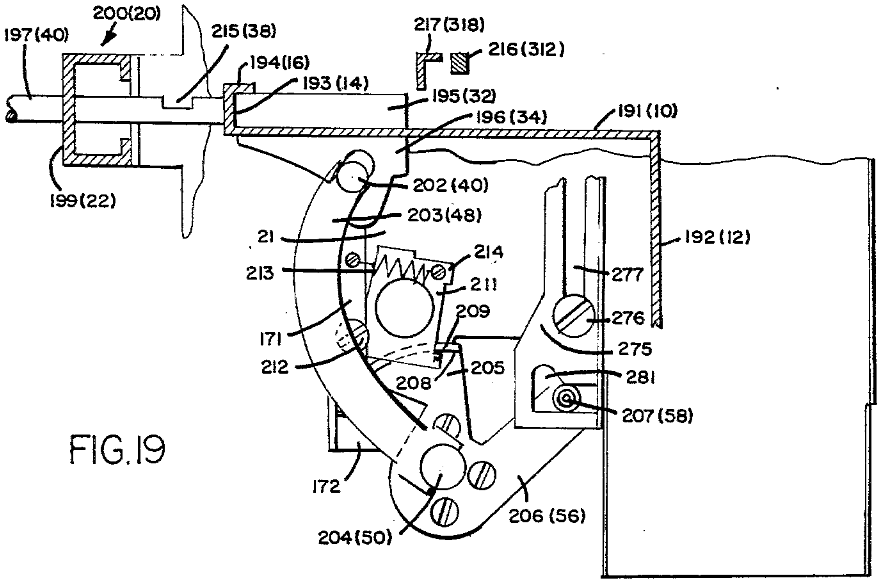
FIG. 19 is a plan view corresponding to FIG. 18 with delivery elements in the delivery position.

The manner in which this vertical motion of lock bar 171 locks and unlocks the vending machine is shown in detail in FIGS. 18 and 19. As mentioned above, the coin counting mechanism of the present invention is adapted among other things, to be substituted directly for the mechanical coin controlled mechanism shown in Du Grenier and Perri U.S. Patent 3,000,485 issued September 19, 1961 without otherwise altering the mode of operation of the vending machine described therein. For this reason only those parts of this prior art vending machine which are necessary for understanding the operation of the mechanical coin counting mechanism of the present invention are shown and described herein and specific reference is made to this prior art for a description of the general mode of operation, and the structural details of the vending machine itself. For convenience the reference numbers used in this application to identify parts common to both the showing in FIGS. 18 and 19 and the showing in U.S. Patent 3,000,485 are followed by the reference number for that part in that patent placed within parentheses.

The vending machine typically comprises a box-like structure provided with a plurality of vertically extending compartments arranged generally side by side for holding the articles to be vended. Each compartment is provided with a horizontal floor member 191 (10) having a depending wall 192 (12) at its rear edge, and an upstanding wall 193 (14) at its front edge provided with a horizontal flange or lip 194 (16). Depending wall 192 (12) cooperates with the side panels and a rear panel of the machine to define a delivery chute. Associated with each compartment is an ejector member 195 (32) provided with a depending hook 196 (34) which extend through slots provided in floor 191 (10) and in depending wall 192 (12). Attached to each ejector member 195 (32) is an operator handle 197 (40) provided with a suitable knob 198 (42). Handle 197 (40) extends through a suitable hole provided in upstanding wall 193 (14) and vertical wall 199 (22) of front brace member 200 (20). The lowermost one of the articles stored in a compartment rest on ejector member 195 (32). When an ejector 195 (32) is drawn forward by associated handle 195 (40) this bottommost article in the compartment drops onto floor 191 (10) from which position it is ejected into the delivery chute by return of ejector member 195 (32) to its original position.

When any ejector member 195 (32) is drawn forward by handle 197 (40) the associated depending hook 196 (34) engages shaft 202 (46) which runs from one side of the vending machine to the other and is attached at each end to an arm 203 (48) which in turn is attached to a stub shaft 204 (50) pivotally mounted in the corresponding side panel of the machine. Stub shaft 204 (50) associated with one said side panel is provided with a solid member rotatable therewith that comprises the cam arm 205 (replacing ratchet arm (52)) and crank arm 206 (56) which is provided with a rotatable extension 207 (58). Spring means (not shown) are provided to urge shaft 202 (46) clockwise (as shown), in opposition to the force exerted by hook 196 (34) when the corresponding operating handle 197 (40) is pulled forward. This spring means returns ejector 195 (32) to its normal position thereby ejecting an article when the operating handle 197 (40) is released. Ratchet arm (not shown) corresponding to ratchet arm (52) (which cooperates with a spring biased pawl (not shown)) may be provided to prevent the return of shaft 202 (46) to its normal position unless handle 197 (40) is pulled all of the way out.

Cam arm 205 which is arranged to pass just beyond the right hand side of panel 21 is provided on its outer edge with an upstanding (i.e. away from panel 21) raised edge 208 which is curved along the radius of the rotation of arm 205 about stub shaft 204 (50). The forward edge of edge 208 is adapted when lock bar 171 is in its upper or locked position to contact inwardly depending tab 209 provided in the lower portion of the outer edge of lock element 201 pivotally mounted at 212 on lock bar 171. Contact between forward edge 208 of cam arm 205 and tab 209 of lock element 211 prevents the further rotation of stub shaft 204 (50) and hence movement of shaft 202 (46). However, when lock bar 171 drops to its lower or unlocked position depending tab 209 drops an equal amount to a position where the lower edge of raised edge 208 may pass over the top edge of tab 209. This permits cam arm 205 to pass between lock element 211 and panel 21 thereby permitting stub shaft 204 (50) to rotate freeing shaft 202 (46) and hence an ejector 195 (32) for article ejecting movement. Since in the sequence for resetting the mechanical coin counting mechanism vertical lock bar 171 is returned to its upper locked position before the cam arm 205 moves out of contact with lock element 211, the lower inner edge of lock element 211 is pivoted to bar 171 and pivot 212 and a spring 213 mounted horizontally between the upper outer corner of lock element 211 and bar 171 is provided normally to urge the upper inner edge of lock element 211 against bar 171. This permits lock element 211 to rotate relative to lock bar 171 therby permitting lock bar 171 to be returned to its upper locked position while tab 209 is in contact with edge 208. A second tab 214 inwardly directed from the upper outer corner and extending far enough to be in sliding contact with panel 21 is provided to stabilize lock element 211. Tab 209 of course is limited in length to permit cam arm 205 to pass between the end of tab 209 and panel 21.

DIFFERENTIAL PRICE UNLOCKING MEANS

As explained above, vertical lock bar 171 is unlocked and permitted to fall when all three cam levers 144, 145 and 146 have moved from their closed position to their open position in which position shoulders 167, 168 and 169 move out of contact with shoulder engaging extensions 174, 176 and 178 of lock arms 173, 175 and 177. This of course corresponds to the condition where a sufficient number of coins have been inserted to permit ratchet wheel 108 to be revolved to the position corresponding to the highest price setting. Supplementary means are required to unlock lock bar 171 at the low price setting, and at the intermediate price setting (assuming of course that the vending machine is designed to vend at three different price levels). The unlocking of lock bar 171 by such supplementary means is accomplished by moving stub lock bar 182 or both stub lock bars 181 and 182 and their associated shoulder engaging extensions 176 and 178 out of contact with cam lever 146 or cam lever 145 and 146 while such cam levers remain in their normal or closed position under specified conditions.

Reviewing the sequence of operation if the three cam wheels 127, 128 and 129 are so adjusted relative to ratchet wheel 108 that the low price is set on wheel 127, intermediate price on wheel 128 and high price on 129 then cam lever 144 will move to the open position when a numer of coins equal in value to the low price setting have been inserted, cam lever 145 will move to the open position (while cam lever 144 remains in the open position) when the value of the coins equals the intermediate price setting and cam lever 146 will move to the open position (while both cam levers 144 and 145 remain in the open position) when the total amount inserted equals the high price setting. For this reason supplementary unlocking means have to be provided to move lock bar 182 and only lock bar 182 (the lock bar associated with high price cam 129) when it is desired to vend at the intermediate price level, and to move both lock bar 181 and lock bar 182 (the lock bars associated with intermediate price cam 128 and high price cam 129) when it is desired to vend at the low price level.

Similar to the disclosure in U.S. Patent 3,000,485 the supplementary unlocking means in each case is actuated by a tab (not shown) normally engaging slot 215 (338) provided in the top of each operating handle 197 (40). Such a tab may be mounted optionally in a position to engage the slot in each such handle on either low price change bar 216 (312) or intermediate price change bar 217 (318). Change bars 216 (312) and 217 (318) are each rotatably mounted between the side frames of the vending machine. Should the operating handle 197 (40) associated with any such tab be pulled forward the tab rides up out of the associated slot 215 (338) onto the upper surface of the corresponding ejector member 195 (32). This rotates the corresponding bar 216 (312) or 217 (318) clockwise (as shown). Each bar 216 (312) and 217 (318) is provided at the side of the vending machine closest the coin counting mechanism with a forwardly extending lever (not shown), and each such rod is provided with a rocker arm (not shown) mounted on the side frame of the vending machine. The rocker arm associated with the lever on the low price change bar 216 (312) contacts rearwardly extending portion 218 of low price change wire 219, and the rocker arm associated with the lever on the intermediate price change bar 217 (318) contacts the rearwardly extending portion 221 of intermediate price change wire 222. The action of the linkage is such that when an operating handle 197 (40) is pulled forward, and if there is associated with that handle a tab attached to either low price change bar 216 (312) or intermediate price change bar 217 (318) the corresponding wire 219 or 222 is depressed. Since this action takes place during the very first portion of the stroke of operating handle 197 (40) the appropriate price change wire (if there be any) is depressed before cam surface 208 of cam arm 205 moves into engagement with tab 209 of lock element 211.

Change wires 219 and 222 pass vertically downwardly to aperture provided in supporting bracket 223 mounted on panel 21. Change wire 219 is pivotally mounted at 224 to the upper inner corner of low price change lever operator 225. Change wire 222 is similarly mounted at 230 to the upper inner corner of intermediate price change lever operator 226. Change lever operators 225 and 226 are both pivotally mounted on the left side of panel 21 on shaft 227. Spacing bushings 228 and 229 and locking bushing 231 are provided on shaft 227 to maintain change lever operators 225 and 226 in proper alignment. Intermediate price change lever operator 226 is provided at its lower edge with an intermediate price change lever 232 which passes through aperture 233 provided in panel 21. Low price change lever operator 225 is similarly provided with low price change lever 234 which passes through aperture 233 below lever 232. In the normal position the rear edge of both levers 232 and 234 rest against the rear wall of aperture 233. A spring indicated at 235 is provided between a point on panel 21 above each change lever operator and a point on the upper surface of each change lever operator to the rear of shaft 227 to urge each such operator toward its normal position.

Referring then to FIGS. 11 and 14 intermediate price change lever 232 which extends horizontally is provided with a yoke element 236 having a slot 237 so arranged that upper extension 238 of stub lock bar 181 may pass therethrough. Lever 232 terminates between stub lock bar 181 and 182 in a downwardly extending portion 239 provided with a horizontal extension 241 which horizontal extension extends through the lower portion of a rectangular slot 242 provided in upper extension 243 of stub lock bar 182. Slot 237 is so arranged that its forward edge rests against the foremost edge of extension 238 of stub lock bar 181 when intermediate price lever operator 226 is in its normal position. Slot 237 extends to such an extent that lever 232 can move a full stroke without there being any contact between extension 238 and yoke 236. Slot 242 is so dimensioned that stub lock bar 182 is free to move for its full threadable stroke together with lock bar 171 without interference with extension 241 of lever 232.

Thus when intermediate price change wire is depressed by the interaction between a tab mounted on intermediate price change bar 217 (318) and a slot 215 (338) on handle 197 (40) the rear edge of intermediate price change operator 226 is depressed moving intermediate price change lever 232 forward relative to aperture 233. Through the engagement of extension 241 of lever 232 with the edge of slot 242 and extension 243 of stub lock bar 182 this motion moves shoulder engaging extension 178 of lock arm 177 out of engagement with shoulder 169 on cam lever 146. At the same time because slot 237 in yoke 236 is free to pass freely about extension 238 of stub lock bar 181, stub lock bar 181 remains unaffected. If, when this happens, cam levers 144 and 145 are in their open position due to the fact that a sum of money equal to the intermediate price level has been inserted into the vending machine, lock bar 171 is free to drop unlocking the vending machine. Otherwise the machine remains locked and the intermediate price change lever operator 226 is returned to its normal position under pressure of its associated spring as soon as the operating handle 197 (40) is released. In this case shoulder engaging extension 178 of lock arm 177 reengages shoulder 169 of cam lever 146.

Low price change lever 234 terminates in extension 244 which passes through a rectangular slot 245 in upper extension 238 of stub lock bar 181. Rectangular slot 245 is sufficiently elongated to permit free up and down motion of stub lock bar 181 without interference between extension 244 of lever 234 and either the upper or lower extremities of the slot. When the rear portion of low price change lever operator 225 is depressed by low price wire 219 due to the interaction between a tab mounted on low price change bar 216 (312) and a slot 215 (338) on handle 197 (40) low price lever 234 is moved forward relative to aperture 233. This motion through the engagement of extension 244 in slot 245 moves stub lock bar 181 forward sufficient to move shoulder engaging extension 176 of lock arm 175 out of engagement with shoulder 168 on cam lever 145. At the same time since the forward edge of extension 238 of stub lock bar 181 rests against the forward edge of slot 237 of yoke element 236 of intermediate price change lever 232 intermediate price change lever 232 is moved forward relative to aperture 233 moving shoulder engaging extension 178 of lock arm 177 out of engagement with shoulder 169 on cam lever 146. Thus vertical lock bar 171 is free to drop to the unlock position if sufficient coins have been inserted into the vending machines to move low price cam lever 144 into the open position. Otherwise bar 171 remains in the lock position and lock arms 175 and 177 reengage the shoulder on the corresponding cam lever when the operating handle is released.

It will be noted that no supplementary unlocking means are provided for the low price lock arm 173 and that therefore this lock arm is released from cooperating shoulder 167 only by the motion of cam lever 144. This can occur only when a number of coins at least equal in value to the low price setting have been inserted into the machine. It will be further noted that lock bar 171 is free to drop under its own weight only when all three lock arms 173, 175 and 177 are free of engagement by one means or another with the corresponding cam lever 144, 145 and 146.

COIN BUCKET

As mentioned above, the coins when they leave chutes 37, 38 or 39 drop directly into a coin bucket 87 located in a rectangular aperture 251 provided in panel 21. Bucket 87 (see FIGS. 7, 8, 9 and 10) is a bottomless rectangular structure formed of two U-shaped members 252 and 253 nested together and joined. The coin retaining bottom is formed by a shelf 254 affixed to panel 21 by means of a bracket 255. A pivot 256 and 257 is provided near the top of each end of bucket 87 at a point substantially midway between the two sides. Pivot 256 is journalled in brackets 258 and pivot 257 is journalled in bracket 259. Brackets 258 and 259 are both mounted on panel 21 in such manner that the sides of bucket 87 extend parallel to panel 21 on either side thereof.

Bucket 87 is maintained in a normally vertical condition by a spring means associated with bracket 259. Bracket 259 is provided with a forwardly extending extension 261. Extension 261 is provided at an intermediate point with an aperture 262 adapted to receive in sliding engagement post 263 mounted outstandingly on the side of bucket 87 and at its end with an outstanding post 264.

When bucket 87 is in its normal vertical position the center line of pivot 257, post 263 and post 264 lies substantially along the same horizontal line with post 263 substantially equal distance between pivot 257 and post 264. Aperture 262 is formed on a radius centered about the center of pivot 257. Two substantially identical levers 265 and 266 are rotatably mounted on pivot 257. Levers 265 and 266 are both provided with a shoulder portion 267 and 268 respectively adapted to engage post 263 and an arm portion 269 and 270 respectively adapted to engage post 264. Levers 265 and 266 are so mounted that the respective shoulder and arm portions lie on opposite sides of the respective posts. A spring 271 is provided between lever 265 and lever 266 to normally keep the respective arms and shoulder portions in contact with the respective posts.

Figure 8:
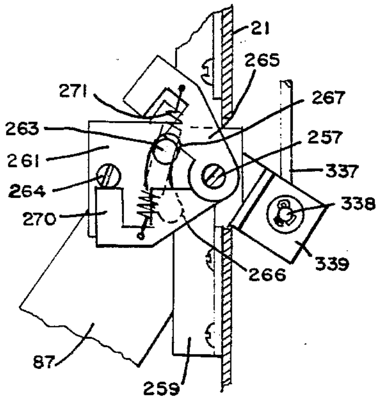
FIG. 8 is a plan view of the coin bucket showing details of the centering hinge with the bucket displaced in one direction.
Figure 9:
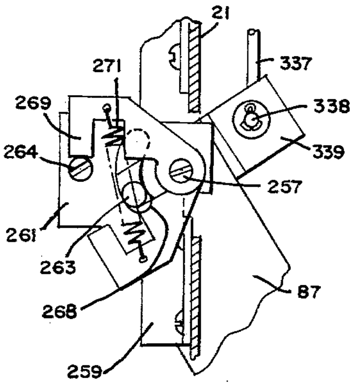
FIG. 9 is a plan view of the coin bucket corresponding to FIG. 8 with the bucket displaced in the opposite direction.

The operation of the spring means associated with bracket 259 is shown in detail in FIGS. 8 and 9. As shown bucket 87 may be moved to one side or the other to the limit provided by the motion of post 263 in slot 262. When moved to one side as shown in FIG. 8 the interaction of post 263 against shoulder 267 of lever 265 raises lever 265 extending spring 271 while lever 266 remains immovable with arm 270 resting against post 264 of extension 261 of bracket 259. As soon as the force causing the tilting motion is removed spring 271 returns bucket 87 to its normal upright position. The same action is obtained to the other side by the interaction of post 263 against shoulder 268 of lever 266 which action moves lever 266 thereby extending spring 271 while lever 265 remains immobile with arm 269 resting against post 264 of extension 261 of bracket 259. The degree of motion of bucket 87 to the one side or the other is sufficient to wipe any coins contained therein off of shelf 254 which constitutes the bottom of the bucket.

COIN BUCKET OPERATOR AND COUNTER RESET MEANS—VENDING CYCLE

Coins received in the coin bucket 87 are retained escrow therein until the bucket is titled to one side or the other sweeping the coins from shelf 254. In the vending or article delivery cycle this motion is initiated by coin bucket operator 275. Coin bucket operator 275 is a vertically extending element mounted for vertical reciprocal travel on the right hand side of panel 21 by means of shouldered mounting post 276 mounted on panel 21 which cooperates with vertically elongated slot 277 in the body portion of operator 275 and shouldered mounting post 278 mounted near the upper end of operator 275 which cooperates with a vertically elongated slot 279 in panel 21. A generally horizontally extending aperture 281 is provided near the bottom of operator 275. Aperture 281 is adapted to receive and to cooperate with rotatable extension 207 (58) and crank arm 206 (56) which is mounted on stub shaft 204 (50). Stub shaft 204 (50) as indicated above, rotates when the vending machine is unlocked and an article is being vended. During each vending cycle the motion of crank arm 206 (56) and its extension 207 (58) in aperture 281 is sufficient to raise operator 275 through substantially a full stroke.

The side of operator 275 adjacent coin bucket 87 is provided with a raised edge 282 which has an outwardly extending portion 283 which acts as a cam surface engaging pivoted cam follower 284 mounted by means of bracket 285 on the edge of bucket 87. As operator 275 moves upwardly in response to movement of crank arm 206 (58) cam surface 283 engages cam follower 284 tilting bucket 87 to the position shown in FIG. 8. In this position the coins contained in bucket 87 are swept off of shelf 254 into coin box chute 286 where they are directed to the coin box (not shown). Cam surface 283 and cam follower 284 are so related spacially that surface 283 contacts follower 284 as soon as stub shaft 204 (50) has rotated sufficiently to indicate that raised edge of 208 of cam arm 204 has not come into contact with tab 209 of lock element 211 and that, therefore, the machine is unlocked and in condition to vend the particular goods selected. Thus the coins are released from coin bucket 87 into coin box chute 286 at the very start of a vending cycle of the machine.

During each vending cycle the coin counting mechanism is reset to the zero or starting position. The elements involved in the resetting operation are all located on the left hand side of panel 21 as shown in FIGS. 2, 15, 16, and 17. There are two basic operations to be performed in resetting the coin counting mechanism. One is to turn vertical lock bar 171 to its raised or locked position. The other is to return ratchet wheel 108 to zero position.

As mentioned above, ratchet wheel 108 is mounted on ratchet wheel shaft 109 which extends through panel 21 to the left hand side thereof. On the left hand side of panel 21 the pinion 118 is mounted on shaft 109. Pinion 118 engages rack 119 of bar 121. Bar 121 is mounted for vertical reciprocal travel in brackets 125 and 127 and is urged downwardly by a spring 122 mounted between a bracket 123 mounted on bar 121 and a bracket 124 mounted nearer the lower end of panel 21.

A second laterally extending bracket 291 is securely mounted on bar 121 and moves therewith. Bracket 291 is adapted to intercept the top surface of mounting post 278 of coin bucket operator 275 as mounting post 278 moves upwardly in slot 279 (see FIG. 17 which shows the components involved in the resetting operation during the vending cycle at the start of said cycle). As ratchet wheel 108 revolves during the coin counting sequence bar 121 drops carrying bracket 291 with it. Then as coin bucket operator 275 is moved upwardly during the vending operation mounting post 278 engages the bottom of bracket 291, and carries bracket 291 upwardly along with it. This raises bar 121 and the interaction between rack 119 and pinion 118 rotates shaft 109 which rotates ratchet wheel 108 and returns ratchet wheel 108 toward its zero or starting position. Bracket 291 is so related spacially to mounting post 278 and to the stroke of coin bucket operator lever 275 that ratchet wheel 108 is returned to its zero or starting position when coin bucket operator lever 275 reaches the top of its stroke. Coin bucket operator lever 275 reaches the top of its stroke in a mechanical vending machine when operator lever 197 (40) has been pulled all of the way out and ejector 195 (32) has engaged the articles to be delivered. Of course as ratchet wheel 108 is returned to its zero position cam levers 144, 145 and 146 are returned to their locked position.

To relock vertical lock bar 171 a generally T-shaped lever 292 pivotally mounted at 293 to panel 21 is provided. Lever 292 comprises a substantially vertical member 294 and a substantially horizontal member 295 which horizontal member extends laterally from a midpoint of member 294. Pivot 293 is located at the juncture of member 294 and 295. Horizontal member 295 is adapted to engage the underside of stub 188 of shaft 183 associated with vertical lock bar 171 and to lift stub 188 and hence bar 171 to its upper or locked position. The lower outer portion of member 294 is provided with a cam surface 296 adapted to intercept mounting post 278 of coin bucket operator 275 as coin bucket operator 275 is raised during the vending cycle. Contact between cam surface 296 of member 294 of lever 292 and mounting post 278 of coin bucket operator 275 moves member 294 to a vertical position, and member 295 to a horizontal position, thus lifting vertical lock bar 171 to its upper or locked position. Contact between lever 292 and post 278 is maintained during substantially the full stroke of operator 275. At the normal lower position of operator 275 mounting post 278 is out of contact with cam surface 296 of member 294 of lever 292 thus permitting horizontal member 295 to drop out of interfering contact with stub 188. In other words lever 292 rocks between two positions: a raised or erected position where cam surface 296 is in engagement with mounting post 278, where member 294 is substantially vertical and where member 295 is substantially horizontal; and a normal position; where post 278 is out of contact with cam surface 296, and where horizontal member 295 drops under the force of its own weight, moving, as shown, the bottom end of member 294 to the left and the upper end to the right.

Lever 292 serves an additional function in that the upper end of member 294 is adapted when lever 292 is erected to engage lever 101 which extends through aperture 102 in panel 21. Lever 101, as mentioned above, when so engaged rotates plate 77 about hinge members 97 and 98 away from panel 21 and moves wire 62 through 66 plus wires 69 and 71 out of their respective slots in the coin chutes.

A supplementary means to keep vertical lock bar 171 in its upper or locked position comprises a locking bar safety latch 297 pivotally mounted on panel 21 at 298. The upper edge of safety latch 297 engages post 299 of coin bucket operator 275 at one end and post 300 on the inner side of lock bar 171 on its other end when coin bucket operator 275 is in its normal or lowered position. Latch 297 keeps lock bar 171 in its upper or locked position so long as coin bucket operator 275 is in its normal or lowered position.

COIN BUCKET OPERATOR AND COUNTER-RESET MEANS—COIN RETURN CYCLE

As mentioned above, the coins are retained in coin bucket 87 until such time as the goods are delivered. For various reasons such as, for example, the fact that a coin is rejected by the stub rejector 28, and as a result the purchaser has insufficient coins to complete a purchase, it is necessary to provide means to return the coins held in the coin bucket 87 to the purchaser and to reset the coin counting mechanism.

This means is actuated by a coin release lever 301 pivotally mounted to the upper end of panel 21 at 302. Lever 301 extends across the top of panel 21 and is adapted by raise means shown at 303 to be engaged by a conventional coin return lever (not shown) mounted on the front panel of the vending machine, and to be depressed thereby. Lever 301 is provided with a projection 304 adapted to engage the coin clearing mechanism 31 of stub rejector 28. Spring means 35 engaging projector 306 of lever 301 and rear flange 22 of panel 21 are provided to maintain lever 301 with its forward end in a normally raised position. A bracket 307 mounted on panel 21 is provided to limit the extent of the upper travel of lever 301.

Figure 15:
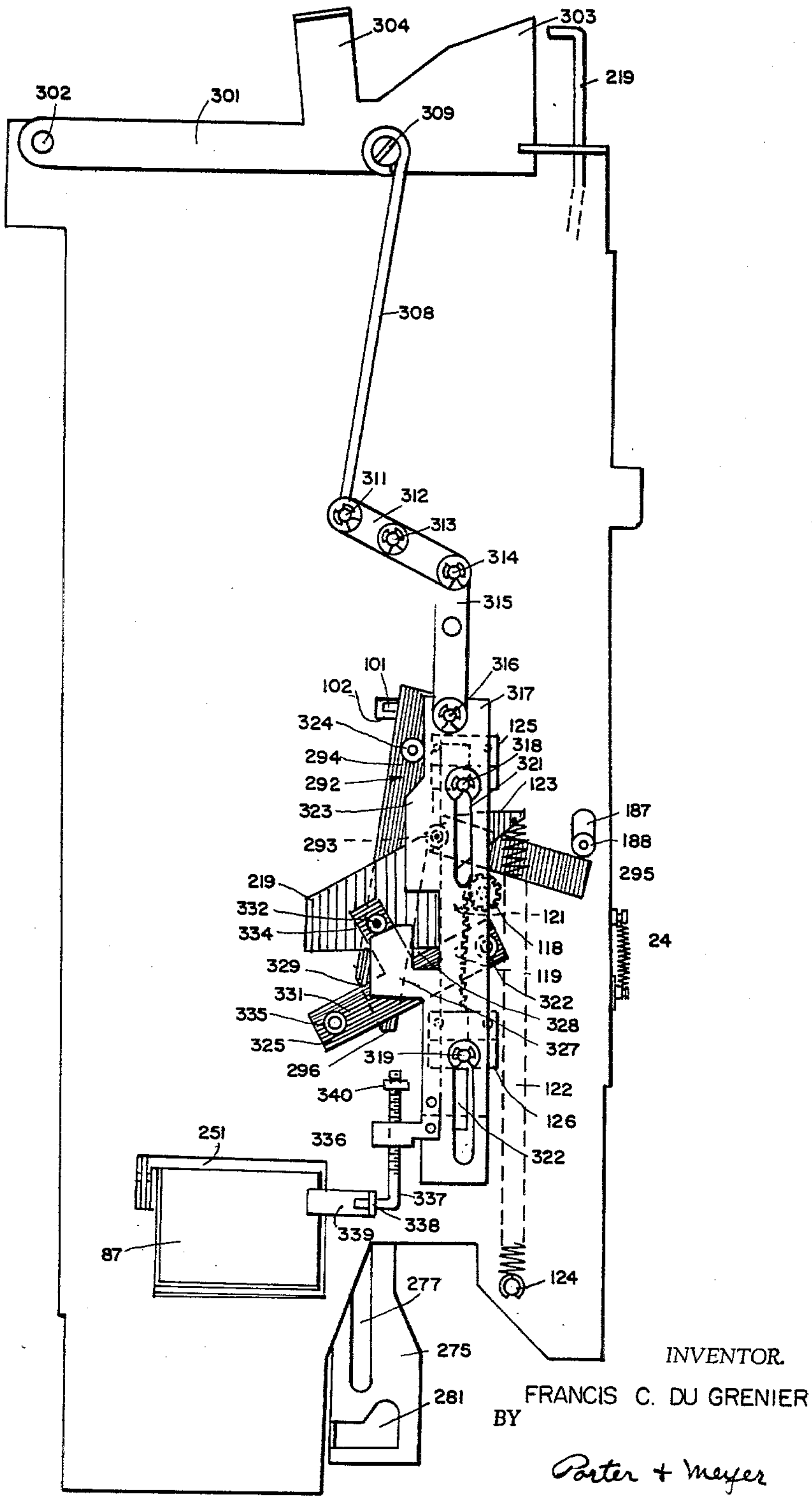
FIG. 15 is a simplified plan view corresponding to FIG. 2 showing the reset elements associated with the coin return cycle.
Figure 16:
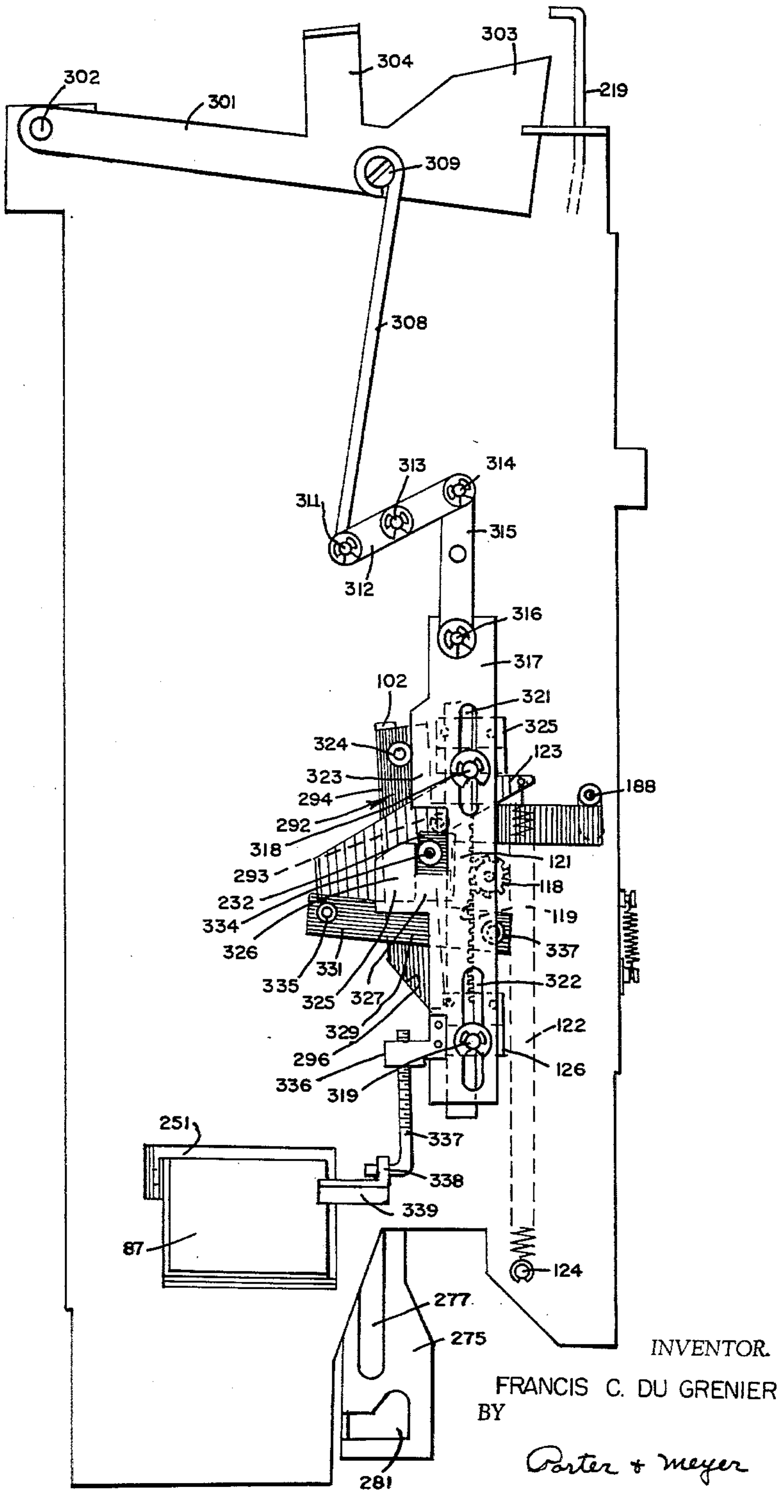
FIG. 16 is a simplified plan view corresponding to FIG. 15 with the coin resetting mechanism in the reset position.
Figure 17:
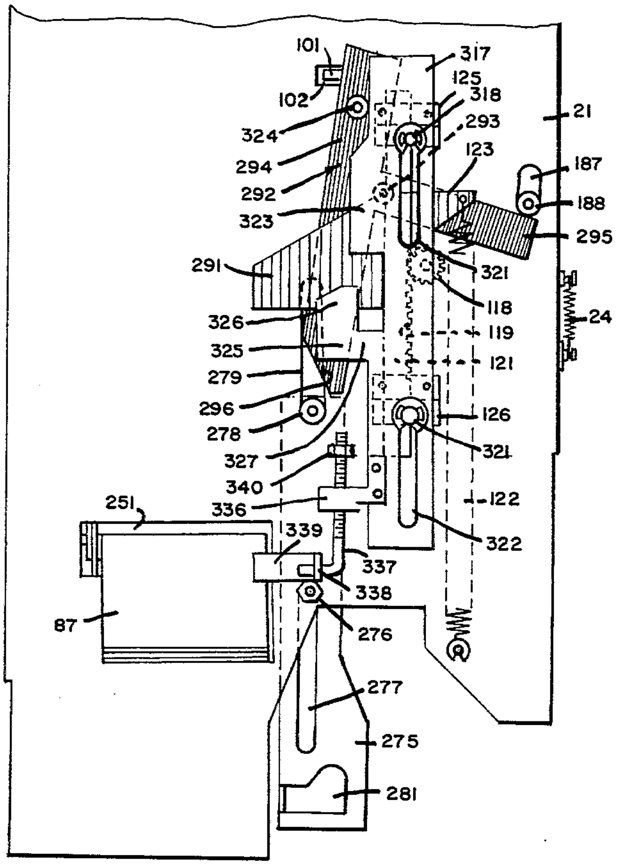
FIG. 17 is a simplified plan view corresponding to FIG. 2 showing the reset elements associated with the delivery cycle.

A push rod 308 is pivotally mounted at 309 to the lower edge of lever 301. Rod 308 extends across the space provided for the mounting of coin rejector 28 and is pivotally mounted at 311 to one end of diagonally extending coin return link 312 which link is pivotally mounted at an intermediate point to panel 21 as indicated at pivot 313. The lower end of link 312 is pivotally mounted at 314 to the upper end of vertically extending coin return lever 315 the rear end of which is pivotally mounted at 316 to pivotally extending coin return operator bar 317. Operator bar 317 is mounted for vertically reciprocal travel by means of mounting posts 318 and 319 mounted on brackets 125 and 126 respectively, which mounting posts engage and cooperate with vertically extending slots 321 and 322 respectively provided in operator bar 317. Upon the operation of the external coin return actuating means (not shown) lever 301 is depressed from an upper position as shown in FIG. 15 to a lower position as shown in FIG. 16. This raises coin release operator bar 317 by means of the linkage described from a lower position to an upper position. This downward motion of lever 301 through the interaction between projection 304 and coin clearing mechanism 31 of slug rejector 28 also actuates the return mechanism of the slug rejector releasing any coin that may be returned therein to rejected coin return passage 35 and 36.

Operator bar 317 is provided on its rear surface near its upper end with an outwardly extending cam surface 323 adapted to engage cam follower 324 mounted near the upper end of vertical member 294 of T-shaped lever 392 in such manner that its operator bar 317 is moved upwardly, surface 323 engages follower 324 and moves lever 292 to its vertical position. As mentioned above, this action moves horizontal member 295 of lever 292 into engagement with stub 188 of mounting shaft 183 raising lock bar 171 to its upper or lock position. As also mentioned above, the motion of lever 292 into the vertical position also actuates lever 101 which, through the linkage described above, moves coin counting wires 62 through 66 plus 69 and 71 out of the various coin chutes releasing any coin that may for any reason be retained in any of the chutes. Cam surface 323 engages cam follower 324 through essentially the full stroke of operator bar 317.

At an intermediate point on the rear surface of operator 317 there is provided an L-shaped bracket 325 which extends to the rear thereof. Bracket 325 comprises a vertical member 326 and a horizontal member 327. A cooperating slot 328 is provided in the rear surface of bar 317. An inverted T-shaped member 329 comprising cross-member 331 and upright members 332 is provided with one end of cross-member 331 pivotally mounted at 333 to panel 21. An outwardly extending cam following stub member 334 is provided near the end of upright member 332 in position to engage the upper surface of vertical member 326. An inwardly extending cam follower stub member 335 is provided in the free end of cross-member 331 to engage the lower surface of bracket 291 mounted on bar 121. Thus as operator bar 317 moves upwardly the interaction between the upper surface of vertical member 326 of bracket 325 and stub member 334 of member 329 rotates member 329 about its pivot at 333 bringing stub member 335 into contact with the lower edge of bracket 291. Further upward travel of bar 317 rotates T-shaped member 329 sufficiently around pivot 333 to return bracket 291 and hence through the linkage described above of bracket wheel 108 to the reset or zero position. The dimension of bracket 325 and of slot 328 are so adjusted that as soon as bracket 291 is raised to the reset position, stub member 334 moves into slot 328 permitting further upward travel or over travel of bar 317. T-shaped member 329 is so dimensioned and stub member 335 is so located thereon that bracket 291 does not come into contact with stub member 335 when T-shaped member 329 is in its normal position until ratchet wheel 108 has made essentially one revolution. The contact between the two resulting from the motion of bar 121 acts as a stop preventing the further and excess rotation of ratchet wheel 108. If it is desired to limit the capacity of ratchet wheel 108 to less than the full amount possible in substantially a single revolution, stub member 335 may be located at another position on T-shaped member 329. Such other position should be on a horizontal line with the position shown for stub member 335 when operator bar 317 is in its upper position (as shown in FIG. 16) so that ratchet wheel 108 will be returned to the zero position. For example, by mounting stub member 335 at the point of intersection of cross member 331 an upright member 332 of T-shaped member 329 in the specific example disclosed the rotation of ratchet wheel 108 is limited to a maximum of 90¢ instead of the maximum of $1.50 as when stub member 325 is located as shown.

At the lower end of coin return operator bar 317 there is attached an outwardly extending bracket 336 having an inwardly extending horizontal portion thereon through which rod member 337 passes. The lower end of rod member 337 is pivotally attached at 338 to bracket 339 which in turn extends outwardly from U-shaped member 252 of coin bucket 87. The upper end of rod member 337 is provided with a stop member 340 adapted to engage bracket 336 when operator bar 317 has travelled sufficiently in the coin return stroke to reset ratchet wheel 108, and to move upwardly with operator bar 317 during the overtravel portion of the operator cycle of bar 317. This motion takes coin bucket 87 towards the left hand side of panel 21 sweeping any coin contained thereon off of bottom shelf 254 into the article vending portion of the vending machine for return to the purchaser. When operator bar 317 is in its normal position as shown in FIG. 15 there is sufficient clearance between bracket 336 and stop member 340 that the tilting of coin bucket 87 toward coin box chute 286 during the vending cycle is not interfered with.

I claim:

1. Mechanical coin counting mechanism for coin operated vending machines comprising coin sorting means adapted to accept coins of a plurality of kinds one by one in random order and to separate such coins according to kind.

coin receiving means adapted to receive such coins and to hold the same until released therefrom by the operation of said vending machine, coin delivery means including a substantially vertical coin chute for each kind of coin, said means adapted to receive such coins from said coin sorting means and to deliver such coins to said coin receiving means, coin counting means including a pawl and associated ratchet wheel and a plurality of coin detecting fingers, said fingers adapted to be deflected by coins passing down said chutes, and when deflected to actuate said pawl, each said coin delivery chute being provided with associated coin detecting fingers in such manner that a coin passing down such chute deflects that number of said fingers proportional to the value of such coin, said fingers being arranged (where more than one such finger is required for a particular chute) an such manner that a coin passing down said chute contacts each such finger associated therewith successively, vending machine unlocking means including a cam wheel assembly associated with said ratchet wheel, a cam following lever assembly associated with said cam wheel assembly, and a lock bar assembly associated with the vending means of said vending machine, said means adapted to unlock said vending means when a sufficient value of coins has been inserted in such machine, and reset means associated with said vending means to reset said coin counting means and to release for retention coins retained in said coin receiving means.

2. Mechanical coin counting mechanism as claimed in claim 1 wherein such coin operated vending machine includes a coin return means and wherein supplementary reset means are provided to reset said coin counting means and to release for return coins retained in said coin receiving means when said coin return means is actuated.

3. Mechanical coin counting mechanism as claimed in claim 1 wherein said pawl is adapted to release a single ratchet tooth on said ratchet wheel each time a coin detecting finger is deflected.

4. Mechanical coin counting mechanism as claimed in claim 1 wherein said cam wheel assembly is rotatably adjustable relative to said ratchet wheel whereby the value of coins at which said vending means is unlocked may be varied.

5. Mechanical coin counting mechanism as claimed in claim 4 wherein said cam wheel assembly comprises a plurality of cam wheels, each separately adjustable relative to said ratchet wheel, wherein said cam follower lever assembly includes a cam follower lever associated with each said cam wheel, and wherein supplemental means optionally associated with individual said vending means are provided to release said unlocking means from selected cam follower levers whereby said vending machine may vend at a preselected plurality of differing total coin values.

6. Mechanical coin counting mechanism as claimed in claim 1 wherein each said coin detecting finger extends into the associated said coin delivery chute and wherein coin deflecting means are provided in each said chute whereby the passage of a coin past each such finger is prevented unless such finger is deflected sufficiently to actuate said pawl.

7. Mechanical coin counting mechanism as claimed in claim 6 wherein said coin deflecting means are so arranged that the passage of a coin from contact with one said coin detecting finger to contact with the next successive said coin detecting finger is prevented until said first said finger has returned toward its normal elevated position sufficiently to reactivate said pawl.

8. Mechanical coin counting mechanism as claimed in claim 1 wherein said coin detecting fingers are interconnected by connecting means for simultaneous reciprocal motion, and wherein said pawl is actuated by said connecting means.

9. Mechanical coin counting mechanism as claimed in claim 8 wherein said coin detecting fingers are pivotally mounted in pivots arranged in vertical array on a common bracket and wherein said bracket is hingedly mounted to permit the removal of said fingers from said chutes.

10. Mechanical coin counting mechanism as claimed in claim 1 wherein each said cam wheel in said cam wheel assembly is provided with an upstanding edge portion at the periphery thereof, wherein each said edge portion is provided with a gate portion, wherein each said cam follower lever in said cam follower lever assembly is pivotally mounted at a mid-point and is provided at one end thereof adjoining the cooperating cam wheel with a pair of inwardly projecting fingers, each said finger adapted normally to engage an opposite side of said edge portion, the finger engaging the inner side of said edge portion adapted to pass through said gate into engagement with the outer edge of said edge portion when said gate passes in contact with said finger whereby the rotation of said cam wheel moves said lever from a normal locked position to a second unlocked position responsive to the rotation of said cam wheel.

11. Mechanical coin counting mechanism as claimed in claim 10 wherein the free end of each said lever in said cam follower lever assembly is adapted to engage an associated projection on said lock bar assembly when in its normal locked position and to be free of such engagement when in its second unlocked position.

12. Mechanical coin counting mechanism as claimed in claim 11 wherein said projection on said lock bar assembly cooperating with one said cam following lever is fixedly attached to said lock bar assembly, wherein any additional said projection is pivotally attached to said lock bar assembly and wherein supplementary means are provided to move any such additional lock bar projection from contact with the associated cam following lever.

13. Mechanical coin counting mechanism as claimed in claim 12 wherein said supplementary means are optionally associated with individual said vending means.

14. Mechanical coin counting mechanism as claimed in claim 2 wherein said lock bar assembly includes a vertically reciprocal lock bar, said lock bar being normally maintained in a raised lock position in which position the vending means is prevented from delivering articles, said lock bar when released dropping to a lower unlocked position in which position said vending means is released to deliver articles.

15. Mechanical coin counting mechanism as claimed in claim 14 wherein said vertical lock bar is provided with means operable with both said vending means and with said coin return means to return said lock bar to the upper locked position when either said means is actuated.

16. Mechanical coin counting mechanism as claimed in claim 2 wherein said ratchet wheel is mounted on a common shaft with a pinion cooperating with a rack whereby as said ratchet wheel rotates said rack moves in a predetermined direction and wherein said reset means associated both with said vending means and said coin return means includes means for restoring said rack to its initial position.

17. Mechanical coin counting mechanism as claimed in claim 2 wherein said coin receiving means includes a coin bucket comprising a hingedly mounted bottomless rectangular structure and an associated fixedly mounted coin retaining shelf, wherein means associated with said vending means are provided to tilt said rectangular structure in one direction, wherein means associated with said coin return means are provided to tilt said rectangular structure in the opposite direction, and wherein double acting spring biased centering means are provided to normally retain said structure in association with said shelf.

18. Mechanical coin counting mechanism as claimed in claim 17 wherein said spring biased centering means comprises a bracket fixedly associated with said coin returning shelf, a pivot for mounting said rectangular structure, the first outstanding post associated with said bracket, a second outstanding post associated with said rectangular structure, said first post, said second post and said pivot all lying on a common line, an upper and a lower arm member pivotally mounted on said pivot each adapted normally to engage both said post therebetween and spring means connecting said arm members normally urging said arm members into close association with said posts.

References Cited by the Examiner

UNITED STATES PATENTS 2,606,639 8/1952 Dolman -------------- 194—9

FOREIGN PATENTS 375,264 12/1930 Great Britain.

LOUIS J. DEMBO, *Primary Examiner.*